Patented Oct. 17, 1950

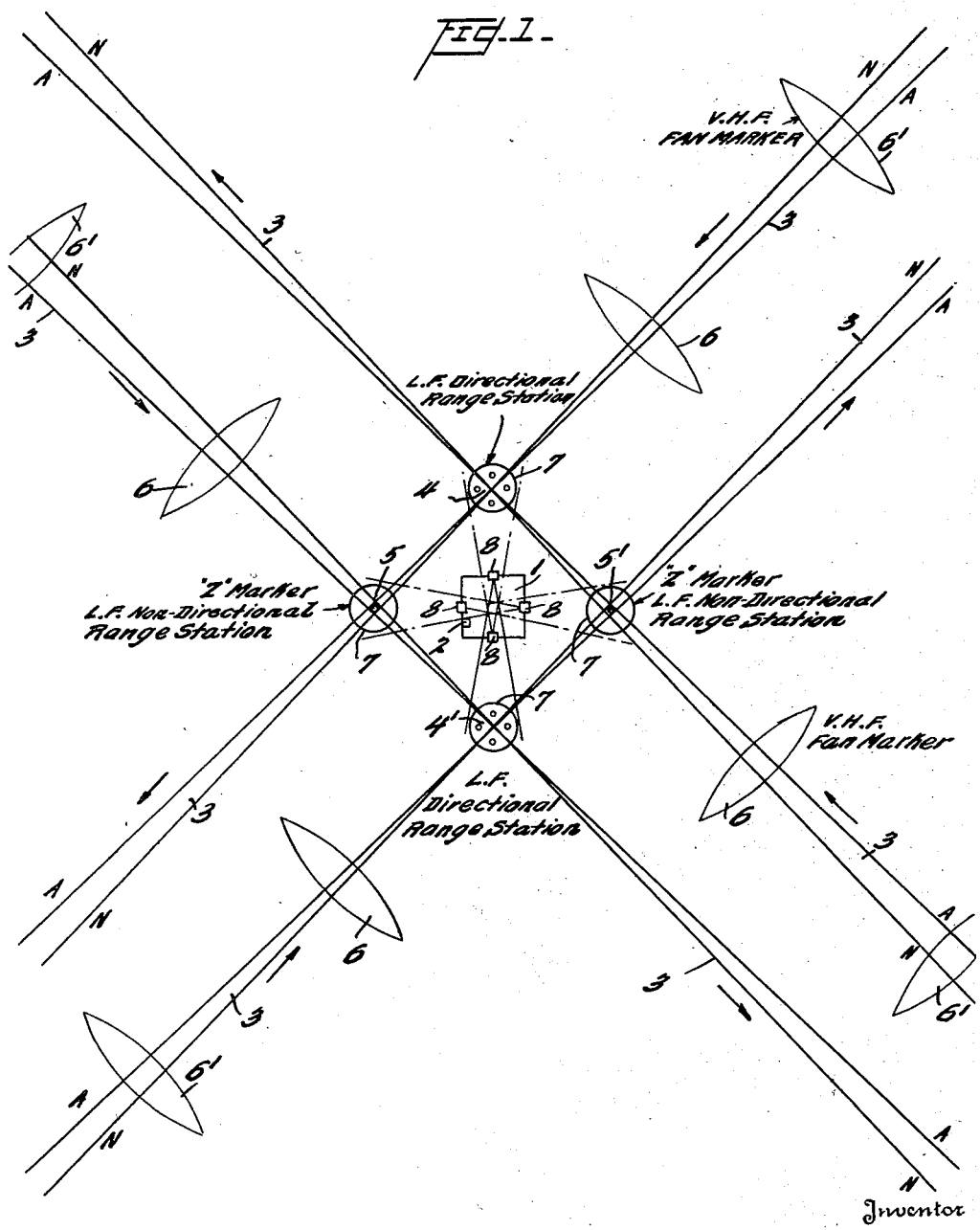

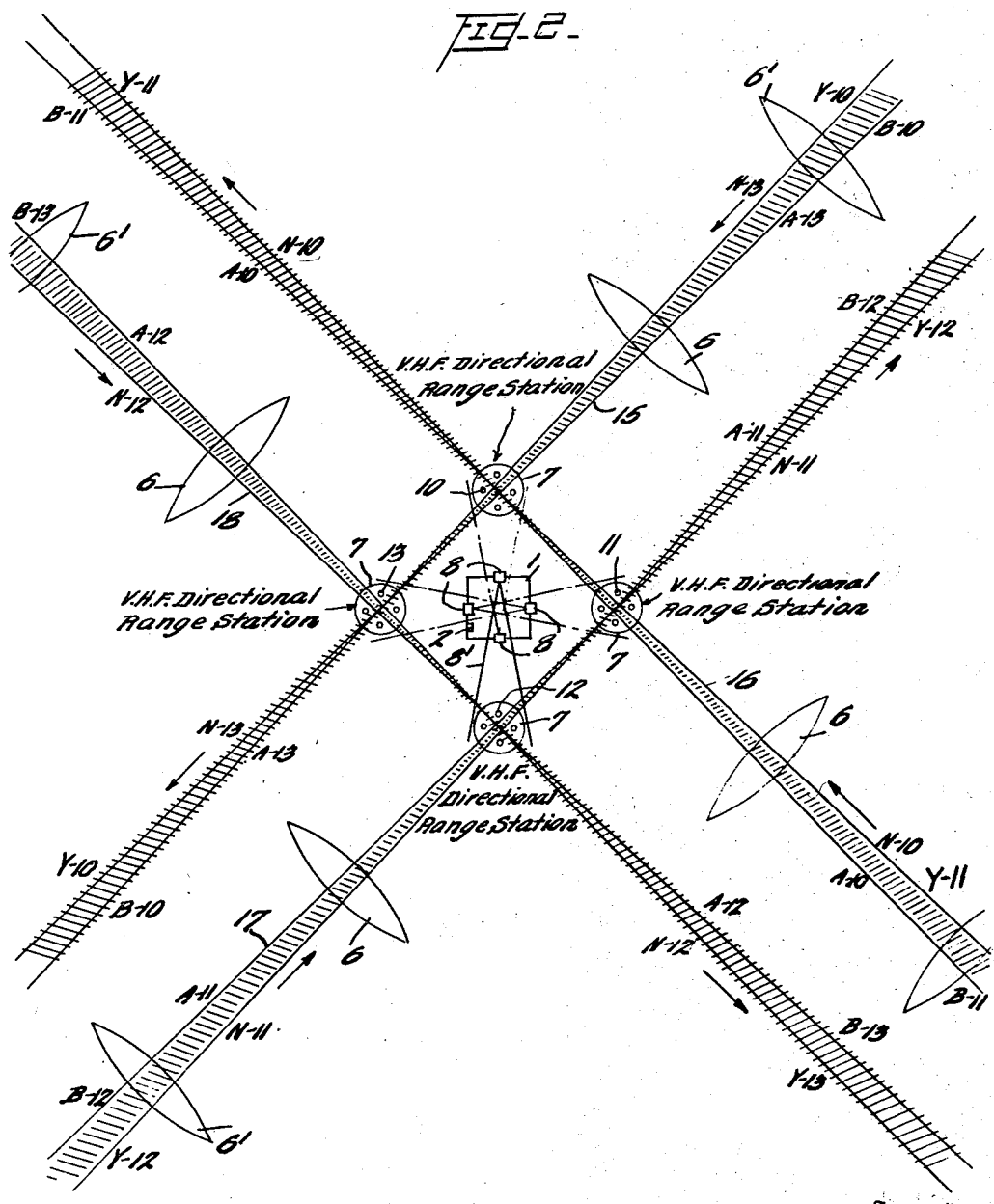

2,525,815

UNITED STATES PATENT OFFICE 2,525,815

SYSTEM OF RADIO AIDS FOR AERIAL NAVIGATION

Raymond G. Lloyd, La Grange Park, Ill.

Application March 20, 1947, Serial No. 735,868

15 Claims. (Cl. 343—107)

This invention relates to arrangements of radio aids for aircraft landing field instrument approach systems, and an object of the invention is to speed up the landing of aircraft and increase the landing capacity, particularly at airports where the facilities have reached the saturation point for landing aircraft during periods of bad weather when ceilings and visibility are low.

A further object of the invention is to increase the safety of landing aircraft in bad weather, while at the same time increasing the capacity of the field for landing the aircraft.

Another object of the invention is to provide a system in which the aircraft can approach the field from any one of four different directions and proceed directly to the field without making preliminary circuits to come into position to approach the field from a particular direction.

Another object of the invention is to provide a system of markers located along the incoming courses by which the airport control tower can indicate to an incoming aircraft whether it is safe to approach closer at the particular time, whereby the aircraft can be systematically kept at safe distances from the airport and from each other when approaching the airport.

Still another object of the invention is to provide a system according to which the various aircraft can be kept at properly spaced positions and can be kept under such control that only one aircraft will come within a definite distance of the field at one time, so that the aircraft coming in for landing can approach the field at very much lower altitudes without danger of colliding with any other aircraft and therefore is enabled to land immediately upon coming into the vicinity of the airport.

A further object of the invention is to provide a system of localizer directional and glide path indicators providing guidance for the aircraft during approach for the landing from any of the four directions.

A further object of the invention is to provide the airport approach system with two directional beam radio range stations, two non-directional radio stations, eight twin transmitter, ultra high-frequency fan-type markers, and four very high-frequency directional glide path localizer radio transmitter stations controllable from the approach control system.

Another object of the invention is to provide an arrangement or system of radio aids for navigation in the vicinity of an airport providing four outbound courses or channels extending in four different directions, enabling an aircraft to depart in any desired direction without any possibility of collision with another aircraft.

In the accompanying drawings:

Fig. 1 is a diagrammatic representation of an airport and a control system according to a first embodiment of this invention; and Fig. 2 is a view similar to Fig. 1 of a second embodiment of the invention.

In Fig. 1 of the drawings numeral 1 indicates a landing field which is represented as being generally square and is provided with a control tower 2 located preferably along one edge of the field or at any desired position.

On each of two opposite sides of the field at distances, for example, of about four miles from the center of the field, is located a low-frequency directional radio range station 4, 4′, each of which sends signals in four quadrants. The frequency of the signals of these stations are slightly different from each other and may be of the order of from 200 to 500 kilocycles. Preferably the signals are interlocking in such a way as to be received as a continuous hum by a receiving instrument in the aircraft along the slightly overlapping lines of junction of adjoining quadrants, and as broken signals, for instance, dot-dash and dash-dot respectively, within the respective quadrants at locations displaced from the overlapping paths along the junctions of the quadrants. The paths along the junctions thus serve as courses or channels to be followed by the aircraft approaching or leaving the airfield. These courses or channels are designated in the drawings by reference numeral 3.

Since there are two directional radio range stations, each providing two approach courses, the field is thus provided with four approach or inbound courses, and the directional beams of the range stations are so oriented as to provide approach course from four different directions. Likewise the other legs of the directional beams provide four outbound courses extending in four directions.

On the other two sides of the landing field at approximately equal distances from the center thereof and located approximately at the intersections of the courses 3 provided by the range stations 4, 4′ are located two non-directional radio range stations 5, 5′ operating at low frequencies which are somewhat different from the frequencies of the directional range stations 4, 4′ and somewhat different from each other. These non-directional range stations 5, 5′ emit continuous signals which are received by radio receivers in the aircraft and are utilized for operating a pair of automatic directional indicators, each of which points to a different one of the stations 5, 5'.

At each of the range stations, both the directional and non-directional stations, is provided a Z-marker 7 which sends an upwardly directed very high-frequency radio signal of inverted cone shape of a frequency of the order of 75 megacycles, and which is received in the aircraft only when the craft is in the cone over one of the Z-markers. The reception of the Z-marker signal may be used to produce either an audible or visual signal indicating to the crewman that the craft is over the Z-marker. These Z-markers may hereinafter sometimes be referred to as inner markers.

The system also includes a total of eight very high-frequency type fan markers, two of these being provided along each of the four approach channels. The closest of the fan markers of each approach channel will be designated as the middle marker, and are indicated in the drawing by numeral 6, and the farthest out fan markers will be designated the outer markers 6'. The middle fan markers may, for example, be located on the inbound courses at approximately eight miles from the corresponding very high-frequency Z-marker or inner marker located at the intersection of the particular course and the first transversely extending directional beam. The outer markers 6' may be located approximately 10 miles farther out than the middle marker 6, that is, about 18 miles out from the respective Z-markers and from the radio range station 4 or 5 of the respective courses.

When one of the transmitters of either of the middle or outer fan markers is put in operation by the system operator at the airport control tower, a light or lights of predetermined color (red, red and green, or green) will glow from a seventy-five (75) megacycle very high-frequency marker receiver indicator on the instrument panel of any aircraft using this instrument approach system and coming within the fan-shaped zone.

Fan markers of this general type have previously been known for giving indications of position to aircraft by lighting of various colored lights in the aircraft. In the use of the present system it is preferably to employ red and green lights. A red light received by an aircraft using this approach system at any fan marker would indicate there is another aircraft ahead and that it would be improper to proceed closer, and therefore that the aircraft should remain at the marker producing the red light. This is accomplished by making complete circles or turns, always to the right. The lighting of both a red and green light in an aircraft would indicate that the channel ahead is being cleared of other aircraft and that the aircraft may now maneuver to a position to continue the approach to the next fan marker or to the airport, whichever the case may be. A green light received by an aircraft coming within a fan marker zone would indicate that the approach channel ahead is clear and that it is permissible to proceed to the next marker or to the airport, as the case may be. After clearing a middle marker, the aircraft proceeds on the course until immediately above the Z-marker 5 located on the said course, and at that time immediately makes a 45° angle turn and proceeds to the airport by following the beam of one of the localizer directional glide path radio stations 8 which would then be put in operation by the control system operator for guidance of the aircraft. Preferably there are four of such localizer stations located at different positions on the airfield, for instance, adjacent the edges of the field, and one or another of said stations could be put in operation, depending on the direction of approach of the particular aircraft being landed. These localizer stations comprise very high-frequency directional beam radio signals, which may be received in the aircraft and used for operating a visual signal indicating whether the craft is directly on the course or off to one side or the other. The frequencies of the localizer range stations may be of the order of 30 to 300 megacycles, for example, about 109.9 megacycles.

The preferred procedure for utilizing the arrangement or system of signal devices according to the embodiment represented by Fig. 1 of the drawings and hereinabove described is as follows. An operator or navigator of an aircraft to be landed at the airport guides his craft along one of the inbound courses leading in the general direction of the airport provided by one of the directional range stations 4, 4', the proper path being indicated by a continuous audible signal produced by a radio receiver tuned to the frequency of the range station. If the signal received produces in the receiver a continuous hum, this indicates to the crewman that the craft is following the proper course. If, however, the signal received is a broken signal, for instance, dot-dash or dash-dot, this indicates the craft is off the course to one or the other side, and that correction of course should be made.

As a further position indication, the aircraft is provided with a pair of automatic directional indicators tuned respectively to the frequencies first of the radio range station located on the inbound course being followed and to the station located on the opposite side of the field from said station. These indicators inform the aircraft navigator of the direction of the craft with respect to said range stations and give a good indication of the proximity of the craft to the landing field by simple triangulation plotting of directions on a map, or an approximate indication of proximity to the landing field simply by observation and mental notation of the relative angles of the indicator pointers.

When the craft reaches the outer fan marker of the course it is following, a signal is received from said marker which may be visual, as, for example, a red light, indicating that another craft is directly ahead between the outer and intermediate markers, or a green light indicating no other craft is between said markers. In the event of reception of a signal indicating the presence of another craft, the operator would then guide the craft in a circle to the right, and upon again reaching the course would again proceed to the fan marker and receive the signal being emitted thereby, which would be either red, indicating another circle must be made, red and green, indicating the course is about to become clear of other craft and to prepare to proceed, or only a green light, indicating it is safe to proceed.

After reception of a green light at the outer marker 6', the craft would then proceed to the middle fan marker 6, and upon reaching same would receive signals of the kind described in connection with the outer marker. Upon, eventual, reception of a green signal, the craft would then proceed to the inner marker, that is, the first Z-marker 7 on the inbound course, at which time the very high-frequency signal would light a white light in the aircraft, signalling its position over the Z-marker. At this time the navigator would be able to check his position by means of the directional indicators. The directional indicator pointer tuned to the first range station on the course should point directly ahead, and the other should point about 45° to the left of the direction of travel. As the craft passes over the first range station, the directional pointer tuned thereto will change direction from forward to rearward. At this time the aircraft should be turned through an angle of 45° to the left and proceed to approach the airfield preparatory to landing, and the operator would then tune a radio receiver to one of the localizer very high-frequency glide path range stations 8 located near the opposite edge of the airfield which emits a low power directional beam which is received in the aircraft as a visual signal, indicating whether the craft is on the proper course or off, and the craft would then proceed to land as usual.

In the embodiment of the invention represented by Fig. 2 in the drawings, the general arrangement is approximately similar to that of Fig. 1 with the exception that all four of the range stations located at spaced positions from the opposite sides of the airfield are very high-frequency directional beam range stations, each of which operates at a somewhat different frequency from each other. For example, the stations might operate at 108.3, 108.7, 109.1 and 109.5 megacycles respectively. These stations are indicated in the drawing by numerals 10, 11, 12 and 13 respectively. These range stations each sends a directional signal in one direction extending at right angles to that of the adjacent stations, which provide the courses or channels 15, 16, 17 and 18 respectively and which are received in the aircraft and used for operating a visual signal device indicating whether the craft is properly on the course or off course to one side or the other.

The visual signal device might be in the known form of a laterally movable pointer which moves relative to a bar or band which is colored blue throughout one half and yellow at the other portion. When the craft is off course to the left, the pointer moves to a position over the blue portion and vice versa. These range stations 10—13 also send directional beams in the transverse direction of the visual beams, and preferably the signal can be received in the aircraft as an audible signal indicating on which side of the course the craft is located. The audible signal would be a continuous hum when the craft is on the course and could be a dot-dash representing the letter A if off to the left, and a dash-dot representing the letter N if off to the right of the course. In Fig. 2 of the drawing on each side of approach course are given the letters B and Y, representing respectively the colors blue and yellow of the visual indicator in the aircraft, each letter having a number associated therewith indicating the range station from which the signal represented thereby is transmitted. Also, on each side of each course are shown the letters A or N respectively representing signals dot-dash and dash-dot, also with a number indicating the range station from which the signal would be transmitted. Assuming, for example, that an aircraft is approaching the airfield 1 along course 15, the craft would be in the path of the visual signal transmitted from range station 10 and in the path of the audible signal transmitted by range station 13. Thus to the left of course 15 (considered with respect to the direction of flight), the designation B—10 indicates that if the craft were off course to the left the blue indication controlled by range station 10 would become prominent in the visual indicator, whereas if the craft were off course to the right the yellow indication controlled by range station 10 would be more prominent. The designation A—13 adjacent course 15 indicates that if a craft approaching on course 15 were off course to the left (considered with respect to the direction of flight), the audible signal received would be a dot-dash indicating letter A and transmitted from range station 13, and if the craft were off course to the right, the audible signal received would be dash-dot or letter N transmitted from station 13.

A preferred procedure for utilizing the system or arrangement provided according to Fig. 2 is as follows: A craft approaching the landing field 1 along the course 15 would first encounter the outer fan marker 6' on said course and would receive either a red, red and green, or green signal and would be guided in a similar manner as explained hereinbefore in connection with the system represented by Fig. 1 of the drawings. Upon receiving the green signal, the craft would then continue along the course. The operator would be guided by the visual signal transmitted from range station 10 and the audible signal transmitted from range station 13. The craft next arrives at the intermediate fan marker 6 and, eventually, upon receiving the green signal would then proceed along course 15 to the inner marker, that is, Z-marker, 7 at range station 10. Upon reception of the signal from the Z-marker, the craft would be turned by the operator through a 45° angle to the left and then follow the beam of very high-frequency, low-power directional beam glide path localizer radio range station 8 located at the opposite edge of the airfield from the approaching craft.

In the operation of the system according to the present invention, it is never possible for more than one craft to be in the close vicinity of the airport at the same time. The signals are so operated from the control tower as to bring the desired craft in directly at a sufficiently low altitude to land without making any circuits or getting on any other course than that from which it approaches, and therefore there is a very considerable saving of time and the craft can be landed at closer time intervals and with much greater safety against possible collision.

A further advantage of the present system is that in the event a craft should overshoot the field, or for any other reason could not land, and would have to continue in flight, an outgoing course is readily available immediately ahead in its direction of flight. After passing the localizer station by which it had been guided to the airport, the craft would proceed to the outbound course directly ahead and leave the vicinity of the airport along a channel which could contain no other aircraft. After reaching a safe distance from the airport, the craft could then maneuver into position to follow an approach course and make a further effort to land.

I claim:

1. An arrangement of radio aids for air fields comprising two double directional beam radio range stations, located on opposite sides of the air field and symmetrically disposed with respect to said field, the beams of each of said stations being substantially at right angles to each other and some of the beams of one station being substantially at right angles to some beams of the other range station, said beams constituting four inbound courses each from a different direction at substantially right angles to the adjacent inbound courses, and providing four outbound courses each spaced laterally from and parallel to an adjacent inbound course.

2. A system of radio aids for aerial navigation in the vicinity of air ports, comprising two radio range stations located on opposite sides of an airport field, said range stations each emitting radio signals in quadrants and providing course beams directed substantially at right angles to each other, the corresponding beams of said stations being substantially parallel to each other respectively thus forming a pattern comprising four inbound channels each substantially at right angles to adjacent inbound channels, and four outbound channels each parallel to an inbound channel and spaced laterally therefrom.

3. An arrangement of radio aids for air fields comprising two double directional beam radio range stations, located on opposite sides of the air field and symmetrically disposed with respect to said field, the beams of each of said stations being substantially at right angles to each other and some of the beams of one station being substantially at right angles to some beams of the other range station, said beams constituting four inbound courses each from a different direction substantially at right angles to the adjacent inbound courses, and providing four outbound courses each spaced laterally from and parallel to an adjacent inbound course and a radio marker beacon which emits an upwardly directed beam located at each of said range stations for signalling an aircraft its position with respect to the air field when located within the beam of one of said marker beacons.

4. An arrangement of radio aids for air fields comprising two double directional beam radio range stations, located on opposite sides of the air field and symmetrically disposed with respect to said field, the beams of each of said stations being substantially at right angles to each other and some of the beams of one station being substantially at right angles to some beams of the other range station, said beams constituting four inbound courses each from a different direction substantially at right angles to the adjacent inbound courses, and providing four outbound courses each spaced laterally from and parallel to an adjacent inbound course, and a radio marker beacon which emits an upwardly directed beam located at each of said range stations and also at the intersections of said courses remote from said range stations, for signalling an aircraft its position with respect to the air field when located within the beam of one of said marker beacons.

5. An arrangement of radio aids for air fields comprising two double directional beam radio range stations, located on opposite sides of the air field and symmetrically disposed with respect to said field, the beams of each of said stations being substantially at right angles to each other and some of the beams of one station being substantially at right angles to some beams of the other range station, said beams constituting four inbound courses each from a different direction substantially at right angles to the adjacent inbound courses, and providing four outbound courses each spaced laterally from and parallel to an adjacent inbound course, and radio marker beacons which emit upwardly directed beams located respectively at each of said range stations and also at the intersections of said courses remote from said range stations, for signalling an aircraft its position with respect to the air field when located within the beam of one of said marker beacons, said intersections and said marker beacons being at positions on the inbound channels from which lines extending at about 45° to the respective courses pass across the air field.

6. An arrangement of radio aids for air fields comprising two double directional beam radio range stations, located on opposite sides of the air field and symmetrically disposed with respect to said field, the beams of each of said stations being substantially at right angles to each other and some of the beams of one station being substantially at right angles to some beams of the other range station, said beams constituting four inbound courses each from a different direction substantially at right angles to the adjacent inbound courses, and providing four outbound courses each spaced laterally from and parallel to an adjacent inbound course, and radio marker beacons which emit upwardly directed beams located respectively at each of said range stations and also at the intersections of said courses remote from said range stations, for signalling an aircraft its position with respect to the air field when located within the beam of one of said marker beacons, and non-directional radio transmitters located at said intersections remote from the directional beam range stations for signalling an aircraft located laterally thereof and providing a means for checking the position of the craft by triangulation.

7. An arrangement of radio aids for air fields comprising two double directional beam radio range stations, located on opposite sides of the air field and symmetrically disposed with respect to said field, the beams of each of said stations being substantially at right angles to each other, and some of the beams of one station being substantially at right angles to some beams of the other range station, said beams constituting four inbound courses each from a different direction at substantially right angles to the adjacent inbound courses, and providing four outbound courses each spaced laterally from and parallel to an adjacent inbound course, and radio beacons located on said inbound courses located spaced outwardly from said range stations emitting upwardly directed signals of elongated shape having their long axes transverse to the respective inbound courses.

8. An arrangement of radio aids for air fields comprising two double directional beam radio range stations, located on opposite sides of the air field and symmetrically disposed with respect to said field, the beams of each of said stations being substantially at right angles to each other and some of the beams of one station being substantially at right angles to some beams of the other range station, said beams constituting four inbound courses each from a different direction substantially at right angles to the adjacent inbound courses, and providing four outbound courses each spaced laterally from and parallel to an adjacent inbound course, each of said inbound courses being provided with two radio beacons spaced outwardly from the respective range stations and being spaced apart from each other, said beacons emitting upwardly directed signals of elongated shape extending transversely of the respective inbound courses.

9. Arrangement of radio aids for aircraft landing fields according to claim 1, and in which the range stations emit signals at a frequency of the order of 109 megacycles.

10. Arrangement of radio aids for aircraft landing fields comprising, four very high-frequency directional beam radio range stations located spaced from the four opposite sides of a landing field, and each station emitting a directional beam in one direction at 90° angle from the direction beam emitted by the adjacent stations, and also emitting beams at a different frequency at 180° from the first-mentioned beams, thereby providing four inbound courses having two signals adapted to be received by different receivers.

11. Arrangements of radio aids for aircraft landing fields according to claim 10, and a radio beacon emitting an upwardly directed ultra high-frequency radio signal beam located at each range station for signalling aircraft their position when in the zone of the upwardly directed beam.

12. Arrangements of radio aids for aircraft landing fields according to claim 10, and radio beacons located along the inbound courses at spaced positions outwardly of the range stations.

13. Arrangements of radio aids for aircraft landing fields comprising, four very high-frequency directional beam radio range stations located spaced from the four opposite sides of the landing field and each station emitting signals in quadrants and providing a directional beam in one direction at 90° angle from the directional beam emitted by the adjacent stations, thereby providing four inbound courses each adapted to be followed by two different receivers, a radio beacon emitting an upwardly directed ultra high-frequency radio signal located at each range station for signalling aircraft their position when in the zone of the upwardly directed beam, other radio beacons located along courses at spaced position outwardly of the range stations, and very high frequency low-power directional beam, localized glide path indicator radio stations located near each edge of the air-field for directing the landing of aircraft after turning to the field from the range station spaced from the opposite edge of the air-field.

14. A system of radio aids for aircraft landing or leaving airports comprising, four range stations located respectively spaced from the four sides of the airport at approximately equal distances, at least two of said range stations being directional beam stations and being located on opposite sides of the airport from each other, said directional beam stations sending beams in four directions each at right angle to the adjacent beams and thus providing four approach and four outbound courses, some of said approach courses extending at approximately 45° to a line connecting the directional beam station of its origin with the airfield, some of said range stations being non-directional beam stations, and some of said approach courses extending at approximately 45° to a line connecting a non-directional beam range station with the airfield, the latter approach courses extending across the said adjacent non-directional beam stations.

15. A system of radio aids for aircraft in the vicinity of an airport comprising a pair of directional beam range stations positioned on opposite sides of the airport, said range stations emitting radio signals in four quadrants each providing two inbound courses at approximately right angles to each other, thus together providing four inbound courses, the adjacent inbound courses of the two stations being approximately at right angles to each other so that the inbound courses extend in four different directions each approximately at right angles to the courses adjacent thereto, and also providing four outbound courses each being approximately parallel to and laterally spaced from an inbound course of the other station, said courses being oriented so that the inbound courses extend at approximately 45° to lines connecting the respective range stations with the airfield and the outbound courses also extend at approximately 45° with respect to said connecting lines.

RAYMOND G. LLOYD.

REFERENCES CITED

The following references are of record in the file of this patent:

UNITED STATES PATENTS

| Number | Name | Date |
| --- | --- | --- |
| 2,174,548 | Barbulesco | Oct. 3, 1939 |
| 2,206,644 | Rocard | July 2, 1940 |
| 2,226,930 | Hefele | Dec. 31, 1940 |
| 2,348,730 | Dunmore et al. | May 16, 1944 |
| 2,364,748 | Norton | Dec. 12, 1944 |
| 2,379,362 | Lear | June 26, 1945 |
| 2,421,017 | Deloraine et al. | May 27, 1947 |

OTHER REFERENCES

"Radio—A Factor in Aviation Safety," by W. E. Jackson, "Radio News," May 1942.

The Ultra Short-Wave Guide-Ray Beacon and its Application, Kramer-Hahnemann, January 1938.